United States Patent [19]

Cohen

[11] Patent Number: 4,932,753
[45] Date of Patent: Jun. 12, 1990

[54] METHOD OF DETECTING STRUCTURES

[76] Inventor: Christopher J. Cohen, 2nd Floor, Charlotte House, Brisbane, 4000, Queensland, Australia

[21] Appl. No.: 174,462
[22] PCT Filed: May 22, 1987
[86] PCT No.: PCT/AU87/00149
  § 371 Date: Feb. 23, 1988
  § 102(e) Date: Feb. 23, 1988
[87] PCT Pub. No.: WO87/07367
  PCT Pub. Date: Dec. 3, 1987

[30] Foreign Application Priority Data

May 23, 1986 [AU] Australia ............... PH6063

[51] Int. Cl.$^5$ ............................. G02B 27/22
[52] U.S. Cl. .................... 350/130; 350/131; 350/136
[58] Field of Search ............ 350/130, 131, 135, 136; 356/1

[56] References Cited

U.S. PATENT DOCUMENTS

| 2,074,088 | 3/1937 | Kurtz | 350/130 |
| 2,929,305 | 3/1960 | Blackstone | 350/130 |
| 2,949,055 | 8/1960 | Blackstone | 350/130 |
| 4,221,462 | 9/1980 | Huvers | 350/136 |

Primary Examiner—Scott J. Sugarman
Attorney, Agent, or Firm—Nilsson, Robbins, Dalgarn, Berliner, Carson & Wurst

[57] ABSTRACT

A method of obtaining a stereoscopic view from two satellite or two aerial photographs (18, 19) of the same or overlapping area. The method involves aligning the photographs (18, 19) in a stereoscope (10) with the horizontal axis (16) of the stereoscope (10) aligned parallel to the flight path taken to produce the photographs (18, 19) or parallel to the scan direction employed by the satellite. The photographs (18, 19) being produced on infra red film in the case of aerial photography or enhanced to accentuate red and infra red in the case of satellite photography. A series of photographs are produced each with a desired color balance. The photographs are cross compared in the stereoscope (10) to produce an enhanced stereoscopic effect to enable detection and/or measurement of structures or effects.

24 Claims, 4 Drawing Sheets

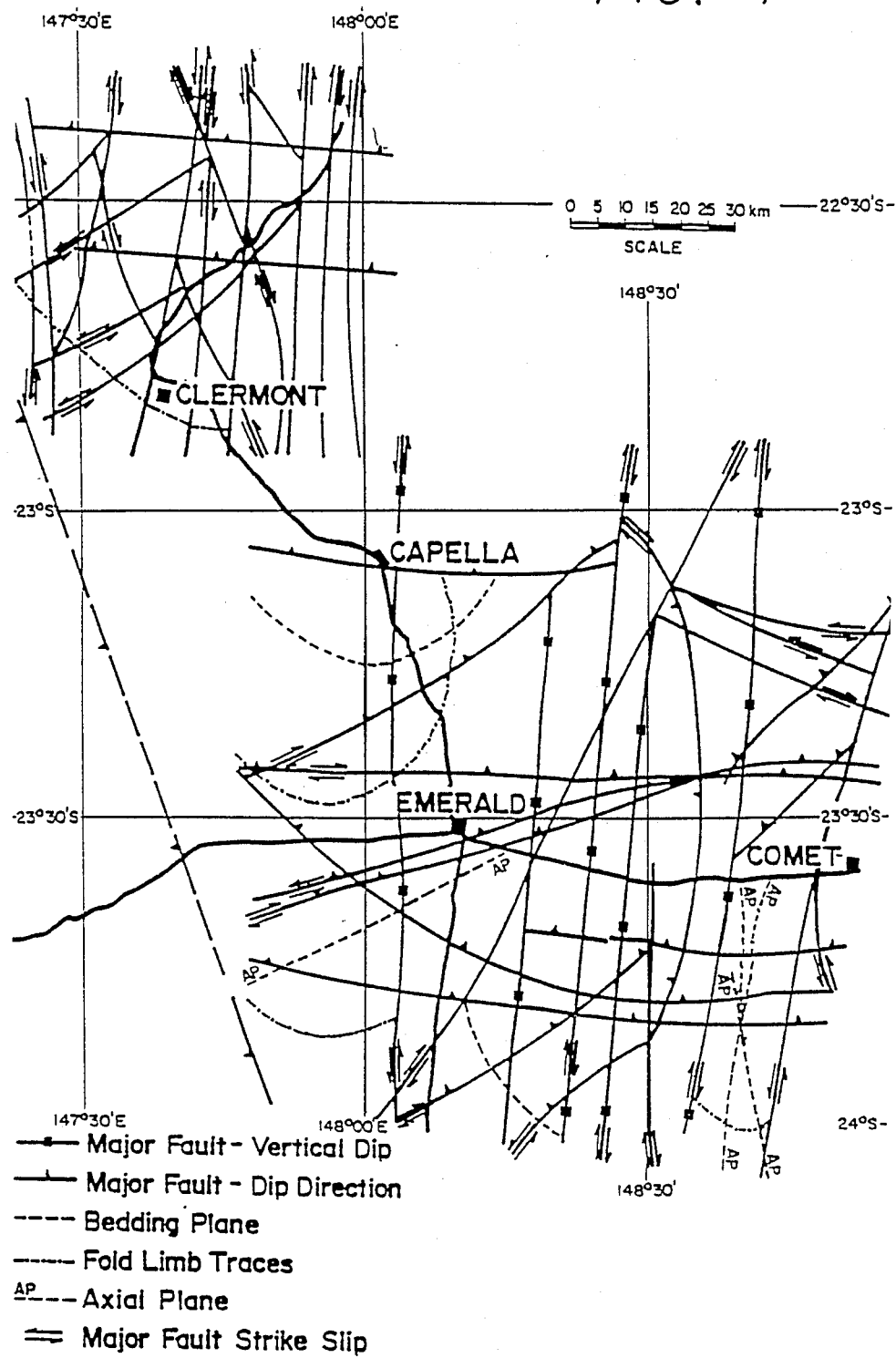

METHOD OF DETECTING STRUCTURES

BACKGROUND OF THE INVENTION

1. Field of the Invention

The invention relates to a method of detecting geological structures and to obtaining stereoscope views from aerial and satellite photographs. In particular the method of the invention concerns detecting geological structures by viewing either aerial photographs or satellite photographs to produce a stereo or 3D effect and to enhance that effect to enable the structures to be more readily detected.

2. Description of Related Art

Aerial photography and in particular the advent in photo-interpretation occurred in the 1960's. Vertical aerial photography includes imaging in the visible as well as the infra red, radar and microwave bands of the electromagnetic spectrum. Both conventional aerial photographs and infra red photographs have specific applications for the science of geology. Aerial photography is confined to enable study in detail of local areas. For a more extensive study a wider photographic coverage is required. For example the study of sedimentary basins on a regional scale to a continental or national scale requires wider photographic coverage. The need for such regional and national scales of study has led geologists to use Landsat or other satellite photographs at scales from 1:1,000,000 to 1:100,000. The invention is concerned with both aerial and satellite photographs.

It is currently believed that stereovision or three dimensional images cannot be obtained from Landsat data. The current practice is for geologists to view standard processed landsat photographs with the naked eye and observe geological structures such as linears. Linears are structures detected involving meansurements in two dimensions only. The detection of linears from photographs provide limited interpretative value unless the structure is investigated and confirmed by geophysical, geomophological or geological data.

Due to this restricted two dimensional observation of photographs information obtainable in this way has been of limited value.

Vertical aerial photography is well established as a geological mapping tool. Vertical aerial photography not only expedites field mapping but also may reveal information that cannot readily be obtained in any other way. Electromagnetic radiation includes ultraviolet radiation, visible light and infra red radiation (IR). Infra red aerial photography is useful in enhancing the contrast of the terrain and bodies of water are sharply contrasted in relation to land and vegetation types may also be contrasted from one another. Thermal imagery has importance from a geological point of view because differences between various rock types and other aspects can also be distinguished. Geological structures such as faults, fractures, joints, folds, crushed zones and others are detectable because of the relationship of the terrain to the rock type.

Infra red aerial photograph employs a yellow filter over the camera to filter out blue light. However, not all of the blue light is eliminated.

Satellite photography employs a sensor unaided by a filter of any kind and it is possible to record the full spectrum. This is limited by the sensitivity and spectral band of the sensor and the range of physical colour bands available to display the electromagnetic radiation recorded.

The Landsat satellite produces photographs called Landsat masters and these can be obtained in either colour or black and white. The photographs are derived from multi-spectral scanner data (MSS) which comprises radiation in four spectral bands:

Band 4 visible green
Band 5 visible red
Band 6 non-visible infra red
Band 7 non-visible infra red The colour master is a composite of three spectral bands printed in registery through non-visible infra red, red and green filters on photographic colour negative material. These masters are referred to as "first generation archival masters" and are used to print second generation customer prints or transparencies. The masters are usually at a scale of 1:1,000,000 and cover an area of 185 kilometers square. The picture elements (or pixels) cover an area of approximately 80 square meters.

It is an object of the invention to provide a method of detecting geological structures from aerial and satellite photographs.

It is another object of the invention to provide a method of stereoscopically viewing two photographs.

SUMMARY OF THE INVENTION

According to one aspect of the invention the method of detecting geological structures from aerial and satellite photographs includes obtaining aerial or satellite images and from these images producing photographs of the same or adjacent areas of land mass with a substantial degree of overlap between the photographs of adjacent areas, the photographs being produced on infra red film in the case of aerial photographs and printing the film to obtain each with a desired colour balance or in the case of satellite photographs enhancing the photograph to accentuate red and infra red radiation and producing a series photograph each with a desired colour balance and viewing in a stereoscope two photographs each of the desired colour balance and of two adjacent areas of land mass with overlap whereby a stereoscopic or three dimensional effect obtained by viewing the photographs in this way is enhanced to enable the ready detection and/or measurement of characteristics of geological structures and/or other archeological, forestry, human effects and atmospheric conditions in photographs.

According to another aspect of the invention there is provided a method of obtaining a stereoscopic view from two photographs of the same or overlapping areas, the photographs being derived from aerial photographs from an aircraft the method including aligning the two photographs of the same or of overlapping areas taken along the flight path of the aircraft in side by side relationship, viewing the photographs with a stereoscope, aligning the stereoscope with its horizontal axis parallel to the flight path and finely rotating the stereoscope along its horizontal axis in alternating dextral and sinistral motion until a maximum definition stereoscopic view is obtained.

According to another aspect of the invention there is provided a method of obtaining a stereoscopic view from two satellite photographs of the same or overlapping areas, obtained by the satellite scanning between two linearly displaced locations, the method including aligning the two photographs side by side, viewing the photographs with a stereoscope, aligning the stereoscope with its horizontal axis parallel to a line connecting the two linearly displaced locations and finely rotating the stereoscope along its horizontal axis in alternating dextral and sinistral motion until a maximum definition stereoscopic view is obtained.

BRIEF DESCRIPTION OF THE DRAWINGS

FIG. 4 is a synoptic resume of structures mapped with the method of the invention.

DESCRIPTION OF THE PREFERRED EMBODIMENTS

Figure 1:
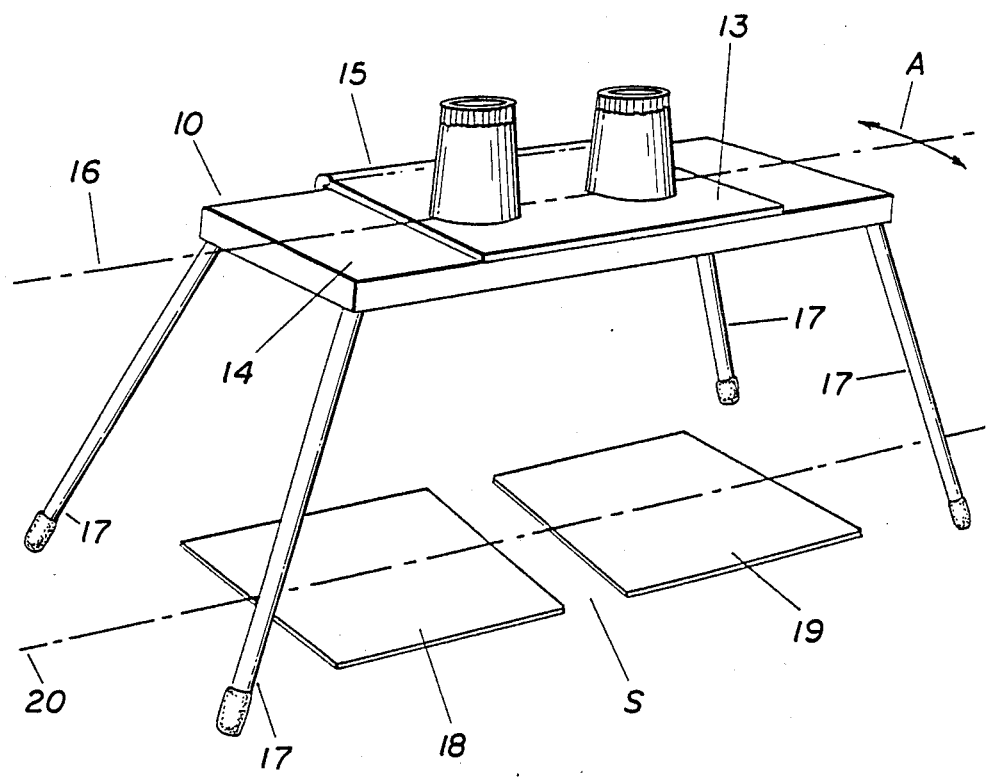
FIG. 1 shows how a stereoscope may be employed to view photographs.

The method of the invention, when aerial photographs rather than satellite photographs are employed may include obtaining a plurality of prints of the same land area or of adjacent land areas having a substantial degree of overlap. The overlap, when photographes from adjacent areas are used may be 60% although this is not critical. The photographs may be obtained from prints made from a colour negative of an area or adjacent area. Alternatively, instead of printing from a negative it is possible to obtain the prints from a positive or colour transparency although the former is preferred.

The plurality of prints are produced by printing from the negative (or positive) and ensuring that graded prints are produced where the colour cast or colour balance of the prints differs from one print of the plurality to the next. For example the plurality of prints may consist of a series or ring around where the first print has a slight magenta cast or other substractive colour cast or a slight additive colour cast and each subsequent print has a slightly greater cast of the same colour. The subtractive colours are magenta, cyan and yellow and the additive colours are red, green and blue. It is preferred that the cast variation be in a regular stepwise change although the change between parts of a series may be non-regular. If desired, further prints may be made to obtain a sub-set of prints between successive prints of the series such that between two successive prints having a colour cast difference a sub-set of prints each of slightly varying cast within the cast range of the two successive prints.

In a typical example the series of prints may consist of eight prints. The set or any sub-set of prints may comprise just one print having a cast intermediate to the two successive prints of the series or alternatively there may be more than one print in a sub-set with each print of the sub-set graded in cast between the casts of the two successive prints of the series.

When printing from a negative the graded cast prints may be produced using colour printing techniques and employing colour compensating filters, colour printing filters or a colour head. Preferably colour compensating filters are employed. In normal colour printing a stack of filters (or a colour head adjustment) is chosen to give a proper colour balanced print which closely resembles the balance of the image photographed. In the method of the invention a colour cast is imparted to the prints. Substractive colour filters include an assortment of magenta, cyan and yellow acetate filters usually in densities between 0.1 to 0.6 or higher with 0.1, 0.2, 0.3, 0.5, 0.6 and 0.02 and 0.05 density filters. In addition to magenta, cyan and yellow filters additive colour filters in red, green and blue in similar density values may also be employed. To obtain the preferred stepwise change in colour cast prints are made successively by a change of filter stack of an enlarger, to ensure that the colour cast increases by a density of 0.1 to 0.2. It should be appreciated the red, blue and green are complementary colours to cyan, yellow and magenta respectively. The colour cast may be achieved by employing filters of any two of these six colours (provided that they are not complementary) in a filter stack and then altering the composition of the stack to obtain the increase in cast for subsequent prints. Each stack employed to produce a series of prints has only two different colour filter types but obviously the two chosen may differ for obtaining successive prints. The following tables are typical examples of filter stacks which may provide colour prints and the prints are listed in increasing colour cast order.

TABLE 1

| Print No. | Filter Stack |
| --- | --- |
| 1 | 0.35 B |
| 2 | 0.10 G + 0.35 B |
| 3 | 0.10 M + 0.35 B |
| 4 | 0.25 M + 0.35 B |
| 5 | 0.30 M + 0.35 B |
| 6 | 0.35 M + 0.30 B |
| 7 | 0.50 M + 0.20 B |
| 8 | 0.60 M + 0.5 B |

TABLE 2

| Print No. | Filter Stack |
| --- | --- |
| 1 | 0.30 G + 0.65 B |
| 2 | 0.20 G + 0.65 B |
| 3 | 0.10 G + 0.65 B |
| 4 | 0.65 B |
| 5 | 0.10 M + 0.55 B |
| 6 | 0.10 M + 0.65 B |
| 7 | 0.20 M + 0.45 B |
| 8 | 0.30 M + 0.35 B |

In these tables the number indicates the filter density and B, G and M denote the filter colour (i.e. blue, green and magenta respectively).

Once the prints for the colour infra red negative are obtained the method involves cross comparing each print of each series. Thus, for table 1 print 1 is compared visually with print 2, 3, 4, 5, 6, 7 and 8, print 2 is compared visually with print 3, 4, 5, 6, 7 and 8 and so on until the permutations are exhausted.

The visual comparison is carried out in a viewer. Preferably a stereoscope is employed. An optimum comparison is possible when the prints are oriented with the horizontal axis of the stereoscope parallel to the flight line direction used during the taking of the photograph. When this situation occurs precision measurements can be made employing the stereoscope and a parallax bar or stereometer. Parallax is an apparent shift in the position of an object with respect to some reference caused by a shift in the point of observation. Absolute parallax is that point in optimum viewing when the natural feature being observed is at its maximum definition. The maximum definition can either be an upright image or an inverse image in stereoscopic vision depending upon which side of the "horizontal" or flight line the viewer stands. By finely rotating the stereoscope along its horizontal axis in an alternating dextral and sinistral motion the maximum definition can be confirmed.

The prints are cross compared as outlined above and the two prints are viewed in the stereoscope until a pair of photographs from the series is selected which optimises the enhancement of interference fringes caused by geological or other structures present in the area photographed. This enhanced effect is achieved because of the stereo vision effect produced by the stereoscope and by the difference in colour cast between the prints of the pair.

The principles of parallax and precision measurement (well known in the art) are then employed to map structures present in the two photographs. Preferably the structures together with their measurements are mapped onto a transparent photo overlay although mapping can be direct onto the photographs.

The method so far described has been in relation to aerial photographs. Stereoscopic vision when viewing satellite photographs is also possible.

The development of Landsat MSS stereoscopic vision as a result, relies upon an indepth understanding of the satellites, flight-line direction and the MSS methodology of scanning pixcels.

The satellite travels on a direct true north to true south flight-line by Universal Transverse Mercator projection. The MSS during flight continually scans from true west towards true east in a bank of six pixels lines in width, then zigzags back without recording, to scan again. The bank represents a directional extent of 185 kilometers, but a width extent of 495 meters (6 pixels at 82.5 meters), in the Landsat 5 Mission.

Each Landsat MSS full scene covers 185 kilometers square. The sides of the photographs are rotated about 9 degrees dextrally from true north at the Tropic of Capricorn. This is due to the near polar orbit at the flying height of 700 kilometers above the Earth. The full scene slopes towards the west because the Earth rotates eastward during the 25 seconds taken by the spacecraft to fly down the scene. The banks of pixels orientate at about 9 degrees dextrally from true east as a consequence—the MSS scan direction being at 90 degrees to the flight-line direction.

The landsat MSS standard master depicts a scene of an area defined by the flight path number and frame number. It is possible to produce non-standard masters which are substitute areas of the standard master scene. These sub-areas are defined by east-west grid lines equally spaced down the scene. The "D" grid being the centre of the scene and "A", "B" and "C" to the north with "E", "F" and "G" to the south. The invention uses full scenes when working with standard and non-standard frames although this is not essential. Through experimentation with substitute areas of scenes a method that effected optimum viewing of stereo pairs became evident.

A sub-area "F" scene is used as a base and is spectrually enhanced in the red/infra red band as previously described. This is overlaid by a "D" master which is also specturally enhanced as previously described. It was found convenient to cut the overlay scene into north—south strips of one half degree UTM widths, corresponding with the longitude grid lines for ease of reference. This ensured proper orientation when overlaying and correct fit for the stereoscope.

The horizontal axis of the stereoscope is aligned across the overlay strips. Absolute parallax occurred when the horizontal axis of the stereoscope was aligned to the bearing 099 degrees 15' UTM which was the west/east scan direction of the MSS. Fine rotating only millimeters is involved. Viewing from the south towards north produces normal upright images, whereas reversing the direction of viewing produces inverted images subject to of course which of the two scenes is on the left or right of the viewer.

The bearing 099 degrees 15' UTM is (over a particular study area) the MSS scan line direction. It is this point in the method of the invention that differs from the norm in photo-interpretration practice—the horizontal axis of the stereoscope is not parallel to the flight-line direction of the satellite. Instead, it is parallel to the medium of the electromagnetic radiation as recorded by the MSS—the pixel scan line direction.

Other relationships became apparent with the study of the non-standard base and standard overlay of Landsat MSS scenes. When viewing from the south to the north, and the "D" standard master is used as the base with the "F" sub-area used as the overlay, then inverted images are produced. The relationship of viewing orientation and base/overlay of stereo-paired photos, to image effects and parallax can be extended to be the same, when using alternative sub-area scenes of the Landsat MSS standard master. That is, "B", "D" and "F", or conversely "A", "C", "E" and "G" sub-area scenes, used of the same Landsat MSS standard master will, when observing these techniques, result in optimum viewing and absolute parallax and good stereoscopic effect.

A standard master (i.e. a colour positive) may be used to obtain a colour negative and that negative may then be employed to produce a "ring around" of prints with graded colour balance as previously discussed in relation to aerial photography.

The scale of photography used, is a matter of choice for the application involved. This study has standardised on 1:250,000 which is the maximum that sufficient structural detail can be obtained for a regional area of study. It would be preferable to use 1:100,000 for a study involving areas of 100 kilometers square. For detailed structural geology studies of local areas (25 kilometers square) infra red photo-interpretation can be undertaken at 1:25,000 scale, after Landsat MSS photo-interpretation surveys have been undertaken.

Research has shown, in studying Landsat photography, that better results are obtained from mid-winter flight scenes. Lowest angle of the winter sun at 30 degrees, compared with a summer sun at 50 degrees elevation; scarcity of vegetation and surface water; and freedom from haze and cloud are but a few considerations for this choice. This method of the invention uses flight scenes covering from the beginning to the end of July 1984, in which the sun elevation ranged from 27 degrees, 46' to 32 degrees 41', with sun azmuths from 42 degrees 04' to 46 degrees 16' UTM, and both increasing respectively from the south to the north over a distance of about 300 kilometers. This is for the southern hemisphere. This factor is important in the methods of the invention.

The lowest angle of the sun will have maximum reflection of the spectral bands thereby giving the greatest illumination of the light/heat interfacing. This defines natural features generally, and in particular, geological structures, through the phenomenon of interference fringes.

The method of the invention provides the ability to obtain stereoscopic views of areas of the Earth from aerial photographs or from satellite photographs regardless of whether the photographs are in black and white or colour. With colour photographs geological and other features may be enhanced and more readily detected and because of the stereoscopic view provided, the enhanced structures can be measured from the photographs. It is possible to obtain measurements of structures such as faults, fractures and, to a lesser extent, joints to within 2 degrees of true dips as determined from field measurement. The structures appear as interference fringes which are parallel light and dark lines resulting when the eye is focused on a plane such that coherent beams of light cross at an angle of about one part in a thousand.

The true thickness of faults, or their zones, can be accurately determined. This is derived by the observation of interference fringes and stereometric measurement.

The rock and the terrain contrast at displaced boundaries of inconsistency to form a structural plane. It is these structural planes—faults, fractures, joints, that are enhanced in the form of a banded line. This banded line, or interference fringe, displays a unique quality of being dark in colour at the up-dip side and light in colour at the down-dip side of the plane being observed. The interference fringe itself can, in most cases of faulting, be stereoscopically heightened to effect (through parallax) its projection from the Earth's surface into the air. The greater the heightening effect—which in practice has been shown to be as much as 15 times the terrain displacement observed—the more accurate the measurements will be.

FIG. 1 shows a stereoscope 10 having two viewing lenses 11, 12 for high power magnification. Those lenses are mounted on a hinged plate 13 which may be hinged away from surface 14 about hinge 15 to expose two low power magnification lenses (not visible). The stereoscope has a horizontal axis 16 and may be pivoted or moved in the direction indicated by doubled headed arrow A. The stereoscope rests on four splayed legs 17 which sit upon a support surface upon which photographs 18, 19 are positioned. Photographs 18, 19 are of a land or sea area. The photographs are representative of overlapping land or sea areas and have been positioned along axis 20 which is coincident with either the flight path of the aircraft used in the taking of the photographs or with the scan direction of a satellite. The spacing S between the photographs is obtained by moving the photographs along (whilst aligned relative to axis 20) axis 20 with low magnification until a stereovision effect is achieved. Then the photographs are viewed at high magnificaion and the stereoscope is moved dextrally or sinistrally along the direction of arrow A until the best stereovision effect is achieved. Structures visible through the stereoscope may then be measured.

Figure 2:
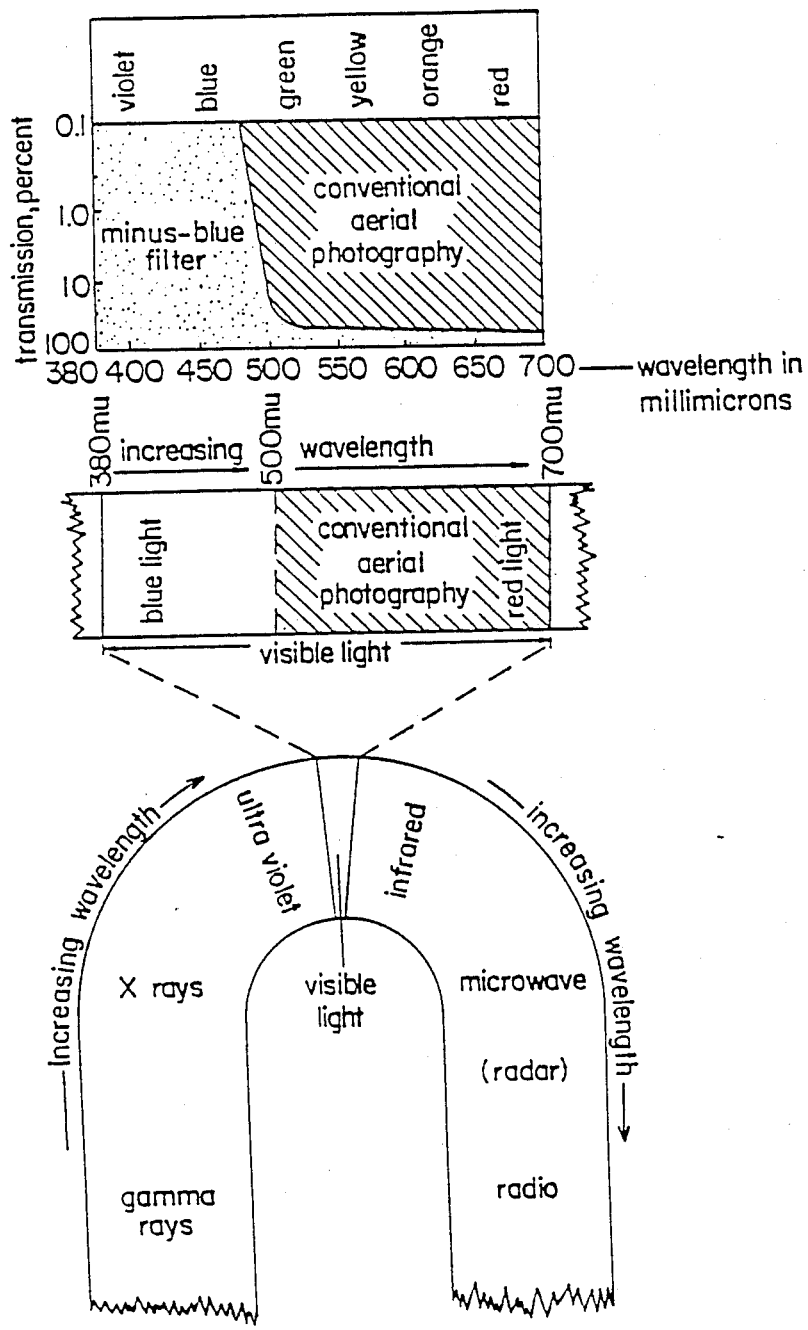
FIG. 2 shows details of the electromagnetic spectrum.

FIG. 2 is a self explanatory and shows the wavelengths of light employed in aerial photography.

Figure 3:
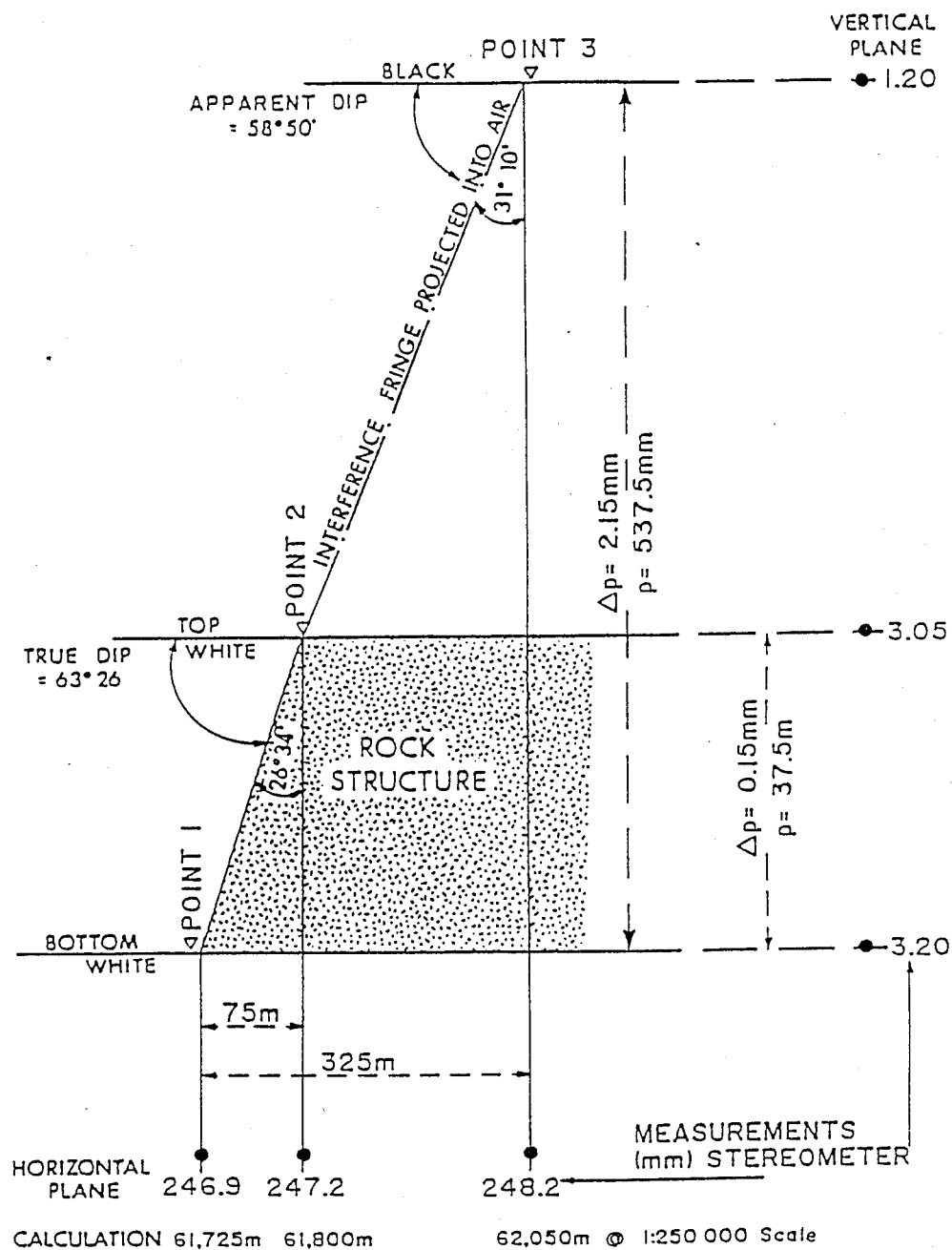
FIG. 3 shows a cross-sectional view of a normal view of a normal fault.

To evidence an interference fringe and illustrate its value reference is made to a typical fault that was observed and measured with a stereometer. FIG. 3 is the cross-sectional drawing of a normal fault that has a 008 degrees UTM strike. This particular fault is classified as major, with a strike continuity of some 25 kilometers in length and expressed over half of its length through a rock structure projecting about 40 meters from ground level (derived through a topographical map survey). The balance of the fault truncates low lying topography at ground level.

Stereometric measurements were taken at three points on the photographs, to represent a cross-section comparison. The air photo base was 256 mm at 1:250,000 scale which represented 64 kilometers. At each point parallax measurements were made in both the horizontal and vertical planes. Point 1 was at ground level, at the base of the rock structure, at the position of the white edged extremity of the interference fringe. Point 2 was at the position of the white edged extremity of the interference fringe, at the level being the top of the rock structure. Point 3 is the line of the interference fringe into the air (as stereoprojected), at the position of the black edged extremity of the interference fringe. All measurements were made across a line at right angles to the strike, or along the bearing 098 degrees UTM.

The parallax formula ... $P = H/f \times p$, where $H/f$ is the scale of photography inversed, and $p$ = parallax difference (top and bottom of pole), is used to derive P, the vertical displacement. The horizontal displacement is calculated from the direct parallax of pole bases converted at the scale of 1:250,000.

The vertical angle from horizontal, sinistrally, from Point 2 to Point 1 is the true dip. The vertical angle from horizontal, sinistrally from Point 3 to Point 2 is the apparent dip. To derive the apparent thickness of the fault ...

$$Tapp = HD - (\cosine\ d \times HD)\ \text{and,}$$

where HD is horizontal distance from Point 1 to Point 3, and d is the difference of true dip to apparent dip (being 4 degrees 36') ... apparent thickness = 1.05 meters and, to derive the true thickness of the fault ...

$$T = Tapp \times \sine\ \text{true dip} \approx 0.94\ \text{meters}$$

The results—true thickness of faults of less than 1 meter and true dips to within 2 degrees of actual, at a scale of 1:250,000—illustrate the value of the invention applied to the science of geology.

In areas of high topographical relief it has been found that normal stereo-imagery (upright features) is beneficial. However in areas of low topographical relief, the use of inverted stereo-images can define the interference fringes better and allow precision measurements to be made. The use of inverted stereo images has an immense value in area of extensive Cainozoic cover for the observation of geological structures.

The specific detection of structures with the method of the invention and their precision measurement can be analysed to determine the mechanisms that cause them. The mechanism that evolve structures are tectonics. The use of Landsat MSS data with the invention can, with minimum field geology confirmations resolve the tectonic regime of the study area.

The invention utilizes the basic considerations of conventional photo-interpretation—tone, texture, pattern, shape and size—to observe and locate geological structures. It can locate and measure bedding planes, fold and axial planes, faults and joints, lithologic sequences, igneous intrusions and other features.

FIG. 4 is a synoptic resume of structures of the Northern portion of the Denison Trough, Central Queensland, Australia mapped using the method of the invention and was obtained by placing an overlay over one of the photographs being stereoscopically viewed and then drawing and measuring the structures which are enhanced by the method of the invention. Only a small proportion of the structures identified in this scene have been detailed in FIG. 3 for the purpose of clarity. Measurements have been omitted for the same purpose.

This study has resulted in the location and definition of geological structures not normally observed in conventional photo-interpretation. Such natural features include structural highs in low topographic relief areas, volcanic flows covered by thick Quaternary sediments, fault loci points (the intersection of all faults at one single point), alternation zones, superimposed folding etc.

The invention provides its results because of the direct effect of electromagnetic radiation upon the Earth. Infra red and Landsat multi-spectral scanner photography can depict this direct effect, through critical contrast of the ultra-violet with the infra red spectral tones. Stereovision through the techniques outlined will derive enhanced images. These stereo-images, through absolute parallax being achieved, can be quantified by stereo-metric measurement.

The degree of parallax achieved may be effected by the Earth's force field: magnetism and gravity. It is through the effect of one or both of these fields that volcanic flows under thick Quaternary sediments have been located. The effect of Earth sourced electromagnetic radiation is evidenced by the interference fringes illustrated in this thesis. It is postulated that radioactive rays and ionization can have an effect that is observable by the method of the invention.

The invention has the potential to extend into areas other than geological mapping and may be employed in archeology, forestry, to detect and measure human effects, atmospheric conditions as well as geology and mining.

I claim:

1. A method of detecting geological structures from aerial satellite photographs including obtaining aerial and satellite images and from these images producing a series of photographs of the same or adjacent areas of land mass with a substantial degree of overlap between the photographs of adjacent areas, the photographs being produced on infra red film in the case of aerial photographs and printing the film to obtain each with a desired color balance or in the case of satellite photographs enhancing the photograph to accentuate red and infra red radiation so as to produce a series of graded photographs where the color balance of the photographs differs from one photograph of the series to the next and viewing in a stereoscope two photographs each of the desired color balance and of two adjacent areas of land mass with overlap whereby a stereoscopic or three dimensional effect obtained by viewing the photographs in this way is enhanced to enable the ready detection measurement of characteristics of geological structures, archeological, forestry, human effects and atmospheric conditions in photographs.

2. The method of claim 1 wherein the overlap of photographs from adjacent areas is between 40 to 80%.

3. The method of claim 1 wherein the photographs are obtained by printing from a negative, positive or transparency.

4. The method of claim 1 wherein the photographs have a magenta cast, other subtractive colour cast or an additive colour cast.

5. The method of claim 2 wherein the photographs have a magenta cast, other substractive colour cast or an additive colour cast.

6. The method of claim 3 wherein the photographs have a magenta cast, other subtractive colour cast or an additive colour cast.

7. The method of claim 1 wherein the cast variation between the photographs of a series is a stepwise regular variation.

8. The method of claim 1 wherein the cast variation between the photographs of a series is a stepwise irregular variation.

9. The method of claim 7 wherein the cast variation between photographs of a series is a stepwise density variation of 0.1 to 0.2.

10. The method of claim 7, 8 or 9 wherein the series of photographs consists of eight photographs.

11. The method of claim 7, 8 or 9 wherein the series of photographs includes a subset of at least one photograph having a cast intermediate the cast of two adjacent photographs of the series.

12. The method of claim 7 wherein each said photograph of the series is compared and viewed with each other photograph of the series or subset and two photographs of the series or subset are selected which provide optimum enhancement of interference fringes in the areas photographed and represented by the two selected photographs.

13. The method of claim 8 wherein each said photograph of the series is compared and viewed with each other photograph of the series of subset and two photographs of the series or subset are selected which provide optimum enhancement of interference fringes in the areas photographed and represented by the two selected photographs.

14. The method of claim 9 wherein each said photograph of the series is compared and viewed with each other photograph of the series or subset and two photographs of the series or subset are selected which provide optimum enhancement of interference fringes in the areas photographed and represented by the two selected photographs.

15. The method of claim 10 wherein each said photograph of the series is compared and viewed with each other photograph of the series or subset and two photographs of the series or subset are selected which provide optimum enhancement of interference fringes in the areas photographed and represented by the two selected photographs.

16. The method of claim 11 wherein each said photograph of the series is compared and viewed with each other photograph of the series or subset and two photographs of the series or subset are selected which provide optimum enhancement of interference fringes in the areas photographed and represented by the two selected photographs.

17. The method of claim 1 wherein the viewing step, when the photographs are derived from aerial photography, is carried out in the stereoscopically with a horizontal axis thereof parallel to the flight line direction used during taking of the photographs.

18. The method of claim 1 wherein the viewing step, when the photographs are derived from satellite photography, is carried out in the stereoscope with a horizontal of the stereoscope aligned with the scan direction of the satellite.

19. The method of claim 18 wherein the two photographs are cut into north-south strips corresponding with longitude grid lines and two selected strips are viewed, one from each of the two photographs.

20. The method of claim 13 wherein the strips are of one half degree UTM widths.

21. The method of claim 1 including measuring characteristics of the geological structures, archeological, forestry, human effects, and atmospheric conditions employing either a parallax bar or stereometer.

22. The method of claim 1 wherein the photographs are viewed to either produce upright or inverted stereoscopic images.

23. A method of obtaining a stereoscopic view from two photographs of the same or overlapping areas, the photographs being derived from aerial photographs from an aircraft the method including aligning the two photographs of the same or of overlapping areas taken along the flight path of the aircraft in side by side relationship, viewing the photographs with a stereoscope, aligning the stereoscope with its horizontal axis parallel to the flight path and finely rotating the stereoscope along its horizontal axis in alternative dextral and sinistral motion until a maximum definition stereoscopic view is obtained.

24. A method of obtaining a stereoscopic view from two satellite photographs of the same or overlapping areas, obtained by the satellite scanning between two linearly displaced locations, the method including aligning the two photographs side by side, viewing the photographs with a stereoscope, aligning the stereoscope with its horizontal axis parallel to a line connecting the two linearly displaced locations and finely rotating the stereoscope along its horizontal axis in alternating dextral and sinistral motion until a maximum definition stereoscopic view is obtained.

* * * * *